(12) United States Patent
Lin

(10) Patent No.: US 8,016,255 B2
(45) Date of Patent: Sep. 13, 2011

(54) PORTABLE ELECTRONIC DEVICE AND MAGNETIC FIXATION BOARD THEREFOR

(76) Inventor: Pi-Fen Lin, Keelung (TW)

( * ) Notice: Subject to any disclaimer, the term of this patent is extended or adjusted under 35 U.S.C. 154(b) by 207 days.

(21) Appl. No.: 12/382,018

(22) Filed: Mar. 6, 2009

(65) Prior Publication Data

US 2010/0102182 A1      Apr. 29, 2010

(30) Foreign Application Priority Data

Oct. 29, 2008  (TW) .............................. 97141564 A

(51) Int. Cl.
*A47G 1/17* (2006.01)
(52) U.S. Cl. .................. 248/206.5; 248/205.1
(58) Field of Classification Search ............. 248/206.5, 248/205.1, 467, 447.1, 309.4; 211/26, 26.1, 211/13.1
See application file for complete search history.

(56) References Cited

U.S. PATENT DOCUMENTS

| | | | | |
|---|---|---|---|---|
| 2,879,614 A | * | 3/1959 | Baldanza | 40/543 |
| 6,135,408 A | * | 10/2000 | Richter | 248/309.4 |
| 7,618,013 B2 | * | 11/2009 | Elmer et al. | 248/309.4 |

* cited by examiner

*Primary Examiner* — Amy J Sterling
*Assistant Examiner* — Erin Smith
(74) *Attorney, Agent, or Firm* — Rosenberg, Klein & Lee

(57) ABSTRACT

The present invention discloses a portable electronic device and magnetic fixation board therefor. The magnetic fixation board is disposed on a surface of a wall or a casing of an electrical product. The portable electronic device has at least one first magnetic element and the magnetic fixation board has at least one second magnetic element. The second and the first magnetic elements magnetically attract each other and the portable electronic device is attached to the magnetic fixation board. Based on the attraction interaction between the first magnetic element of the portable electronic device and the second magnetic element of the magnetic fixation board, when the portable electronic device is standing idle, users can directly locate the portable electronic device on the magnetic fixation board in the attraction mode and arrange the portable electronic device conveniently, thereby improving the impressions of using electrical products.

21 Claims, 8 Drawing Sheets

PORTABLE ELECTRONIC DEVICE AND MAGNETIC FIXATION BOARD THEREFOR

BACKGROUND OF THE INVENTION

1. Field of the Invention

The present invention relates to a portable electronic device and magnetic fixation board therefor, and more particularly to a portable electronic device and magnetic fixation board therefor wherein the portable electronic device can be disposed on the magnetic fixation board when it is standing idle.

2. Description of Related Art

Portable electronic devices (such as remote controllers, wireless telephones and other electronic devices) are used widely in modern society. Generally, remote controllers are used for switching household appliances (such as TV sets and air conditioners and so on) and adjusting related functions, and wireless telephones are used for free communication. They are so convenient that people are dependent on them very much. Accordingly, portable electronic devices become necessary equipment for consumers on the market.

During the early stages of development of the household appliance market, people focused on functionality, long service life and low fault rates of electrical products. However, with the development of the market, portability and good appearance of electrical products are further demanded besides practicality.

Conventional portable electronic devices are often arbitrarily placed on tables or sofas by users after being used, which brings the shortcomings as follows:

1. The portable electronic devices are easy to be dropped or struck. Since the portable electronic devices are precise electronic devices, they break down easily if subjected to improper forces.

2. Various electrical products all have portable electronic devices, so the various portable electronic devices may be a cause of disorderliness if they are not arranged properly.

Hence, the inventors of the present invention believe that the shortcomings described above can be improved and finally suggest the present invention which is of a reasonable design and is an effective improvement based on deep research and thought.

SUMMARY OF THE INVENTION

A main object of the present invention is to provide a portable electronic device and magnetic fixation board therefor wherein the portable electronic device can be directly disposed on the magnetic fixation board by attaching when the portable electronic device is idle, thereby the portable electronic device can be arranged easily and the impressions of using electrical products can be improved.

To achieve the above-mentioned object, a portable electronic device in accordance with the present invention is provided. The portable electronic device can be magnetically attracted and fixed to a magnetic fixation board which is disposed on a surface of a wall or a casing of an electrical product and includes a second magnetic element. The portable electronic device includes at least one first magnetic element; wherein the first magnetic element and the second magnetic element magnetically attract each other and the portable electronic device is attached to and disposed on the magnetic fixation board.

To achieve the above-mentioned object, a magnetic fixation board in accordance with the present invention is provided. The magnetic fixation board is disposed on a surface of a wall or a casing of an electrical product and attaches and fixes a portable electronic device via magnetic attraction, wherein the portable electronic device includes a first magnetic element. The magnetic fixation board includes at least one second magnetic element; wherein the first magnetic element and the second magnetic element magnetically attract each other and the portable electronic device is attached to the magnetic fixation board.

To achieve the above-mentioned object, a portable electronic device and magnetic fixation board therefor in accordance with the present invention is provided, wherein the magnetic fixation board is disposed on a surface of a wall or a casing of an electrical product. The portable electronic device and magnetic fixation board therefor includes a portable electronic device having at least one first magnetic element; and a magnetic fixation board having at least one second magnetic element; wherein the second magnetic element and the first magnetic element magnetically attract each other and the portable electronic device is attached to the magnetic fixation board.

The present invention has the efficacy as follows: based on the attraction interaction between the first magnetic element of the portable electronic device and the second magnetic element of the magnetic fixation board, the present invention can provide an immobile place for users to arrange the portable electronic device, thereby avoiding that the portable electronic device is arbitrarily placed and then dropped or struck.

When the portable electronic device of the present invention is standing idle, users can directly locate the portable electronic device on the magnetic fixation board in the attraction mode and arrange the portable electronic device conveniently, thereby avoiding leaving houses disorderly and improving the impressions of using electrical products.

To further understand features and technical contents of the present invention, please refer to the following detailed description and drawings related the present invention. However, the drawings are only to be used as references and explanations, not to limit the present invention.

DETAILED DESCRIPTION OF PREFERRED EMBODIMENTS

Please refer to FIGS. 1-6 illustrating a portable electronic device and magnetic fixation board therefor according to the present invention which includes a portable electronic device 1 and a magnetic fixation board 2.

Figure 1:
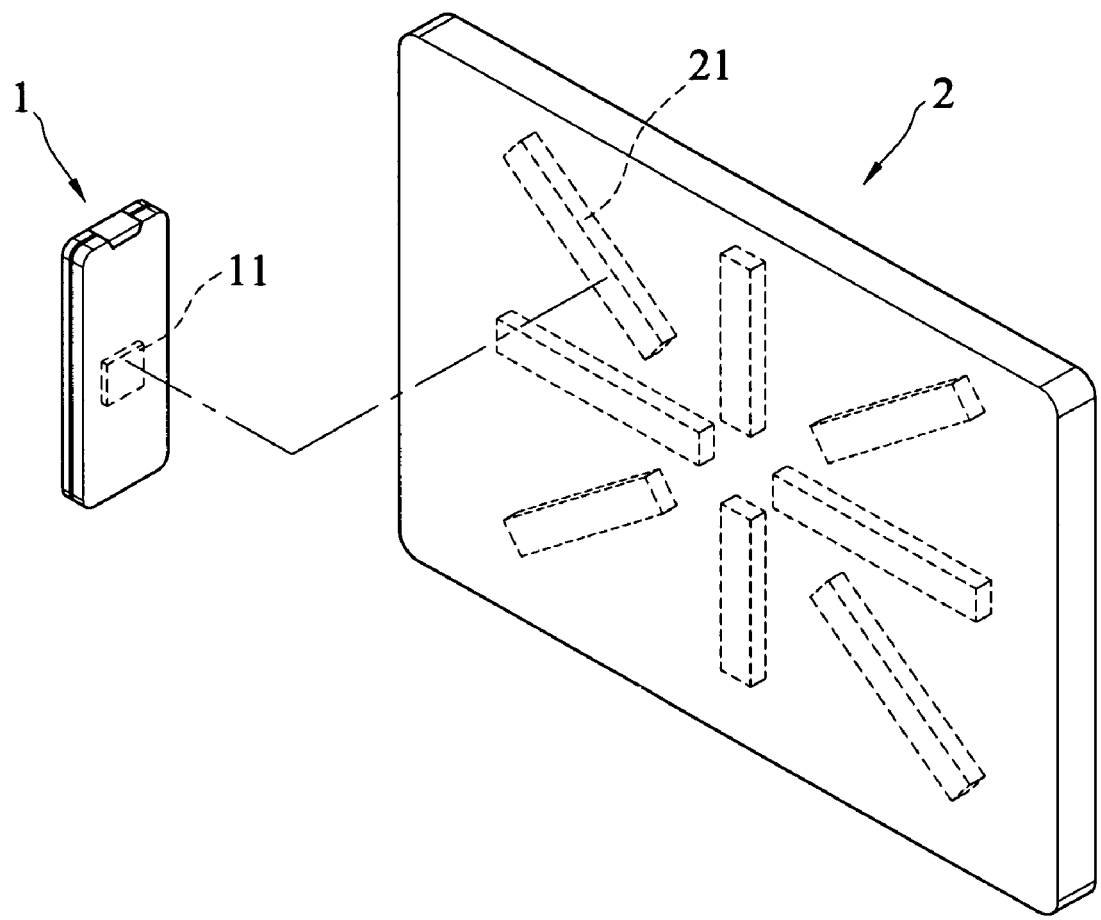
FIG. 1 is an exploded perspective view of a portable electronic device and magnetic fixation board therefor of the present invention.

Please refer to FIG. 1, the portable electronic device 1 has at least one first magnetic element 11. The first magnetic element may be a magnet or a metal element which may attract magnets. The first magnetic element 11 may be built in a proper position in the portable electronic device 1 or disposed on a surface of the portable electronic device 1 (not shown).

The magnetic fixation board 2 is a thin board of which the area is larger than that of the portable electronic device 1. The magnetic fixation board 2 has at least one second magnetic element 21 which may be a magnet or a metal element that may attract the first magnetic element 11. The second magnetic element 21 and the first magnetic element 11 may be combined by magnetic attraction.

It is worth mentioning that the first magnetic element 11 and the second magnetic element 21 may be magnets which attract each other; alternatively, one of them is a magnet and the other is a metal element. In other words, the arrangement modes that ensure that the first magnetic element 11 is attracted by the second magnetic element 21 may all be equivalent changes of the present invention.

The magnetic fixation board 2 has a plurality of second magnetic elements 21 of which each is long-strip-shaped. The second magnetic elements 21 are arranged radially around the centre of the magnetic fixation board 2, in order to produce the largest possible magnetic area while the least magnetic or metal materials are used.

Figure 2:
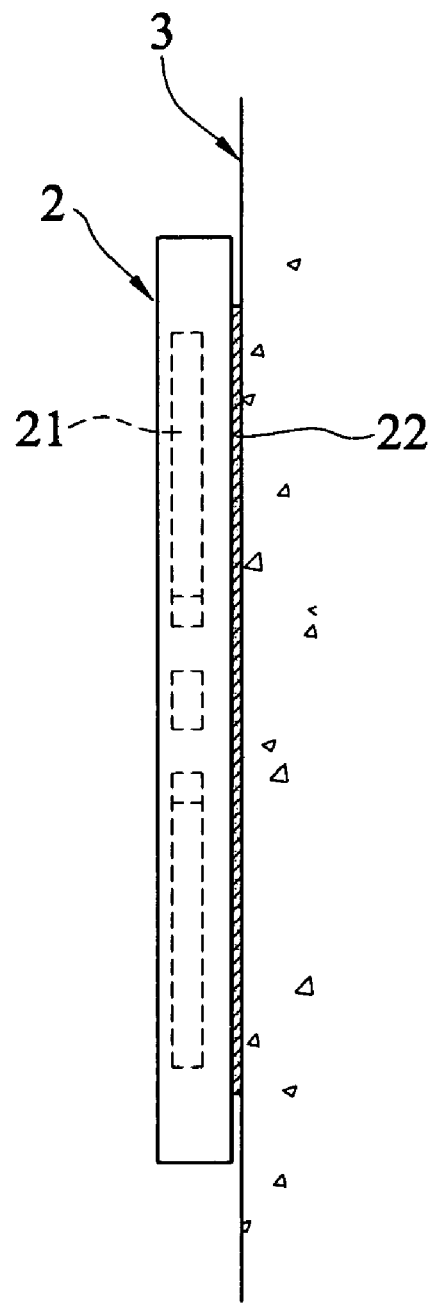
FIG. 2 is a schematic view of the magnetic fixation board of the present invention, adhering to a surface of a wall.

Please refer to FIG. 2, the magnetic fixation board 2 fixedly adheres to a surface of a wall 3. An adhesive element 22 is disposed on a rear surface of the magnetic fixation board 2. The adhesive element 22 may be an adhesive strip which attaches the magnetic fixation board 2 to the surface of the wall 3 firmly.

Figure 3:
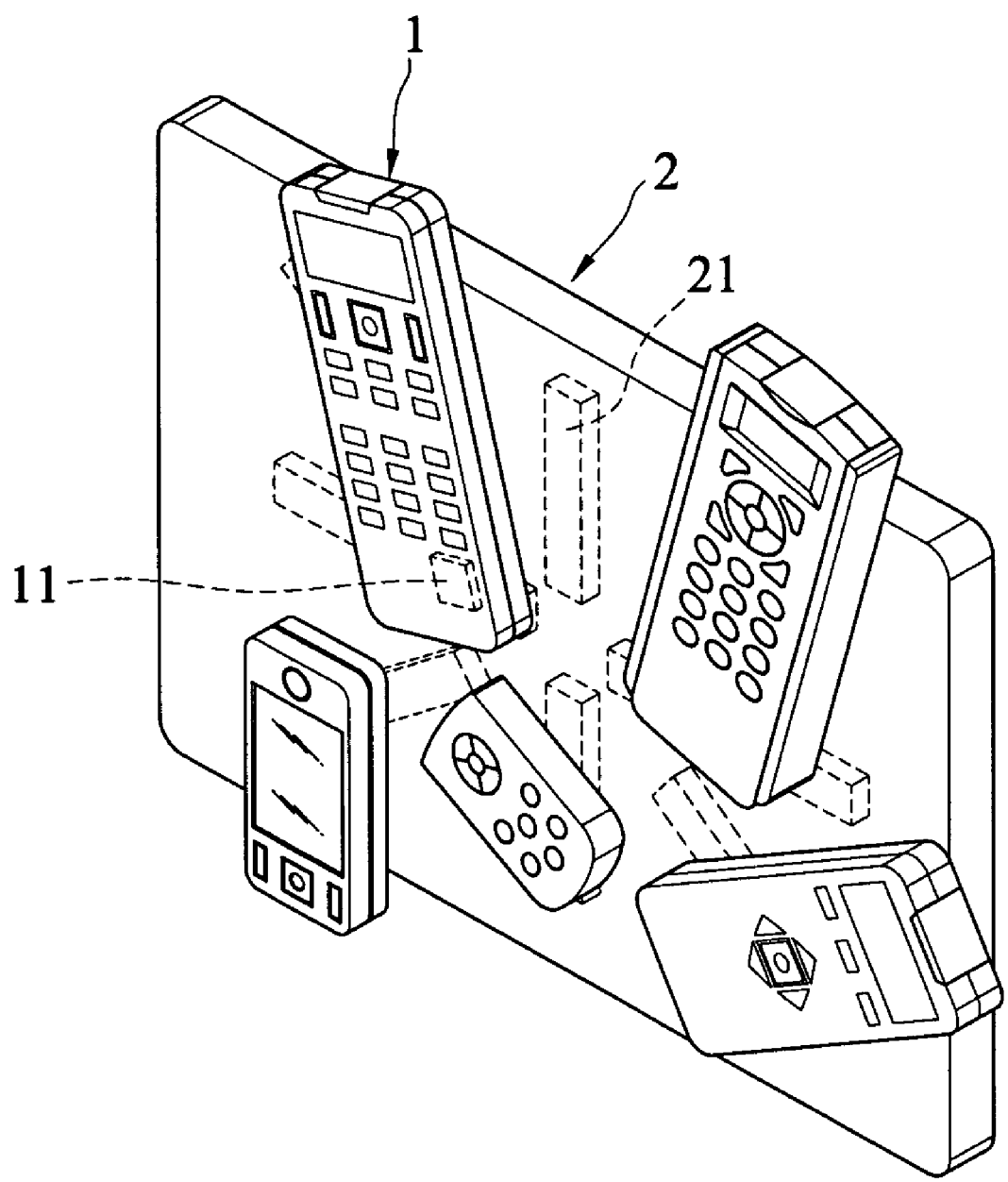
FIG. 3 is a perspective view of the portable electronic device disposed on the magnetic fixation board of the present invention.

Please refer to FIG. 3, based on the magnetic attraction interaction between the first magnetic element 11 and the second magnetic elements 21, the portable electronic device 1 can be magnetically attracted to and disposed on the magnetic fixation board 2 firmly. Because the second magnetic elements 21 are arranged radially around the centre and show a large magnetic area, users can firmly attach the portable electronic device 1 to the magnetic fixation board 2, easily and freely, without aiming at a special position.

Figure 4:
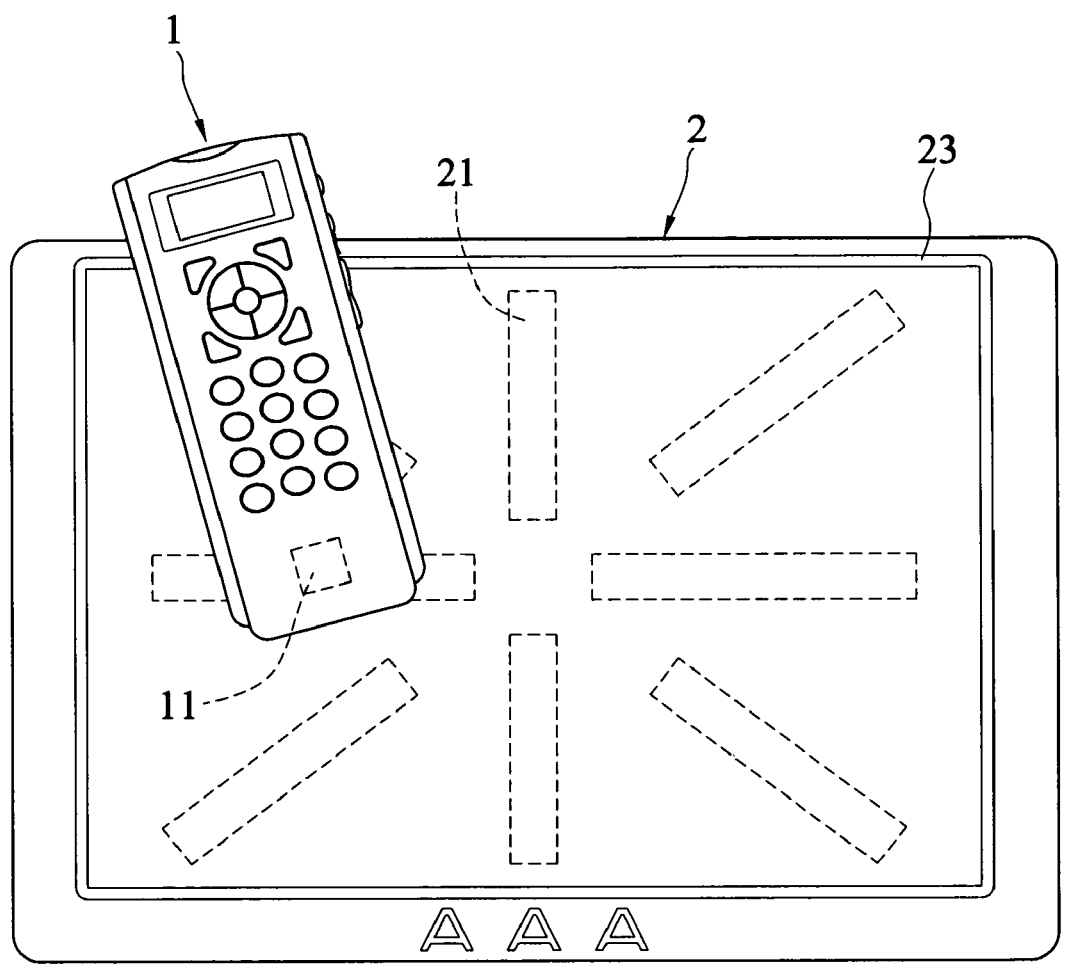
FIG. 4 is a schematic view of the magnetic fixation board with a fluorescent coating of the present invention.

Please refer to FIG. 4, the magnetic fixation board 2 further has a fluorescent coating 23 which may emit light by itself in the darkness without electricity consumption. The fluorescent coating 23 is disposed on the front surface of the magnetic fixation board 2 and surrounds the magnetic area defined by the second magnetic elements 21. Accordingly, the fluorescent coating 23 emits light in the darkness to form a light-emitting square frame which forms a region with a magnetic attraction effect therein, thereby directing users to dispose the portable electronic device 1 in the proper position.

Figure 5:
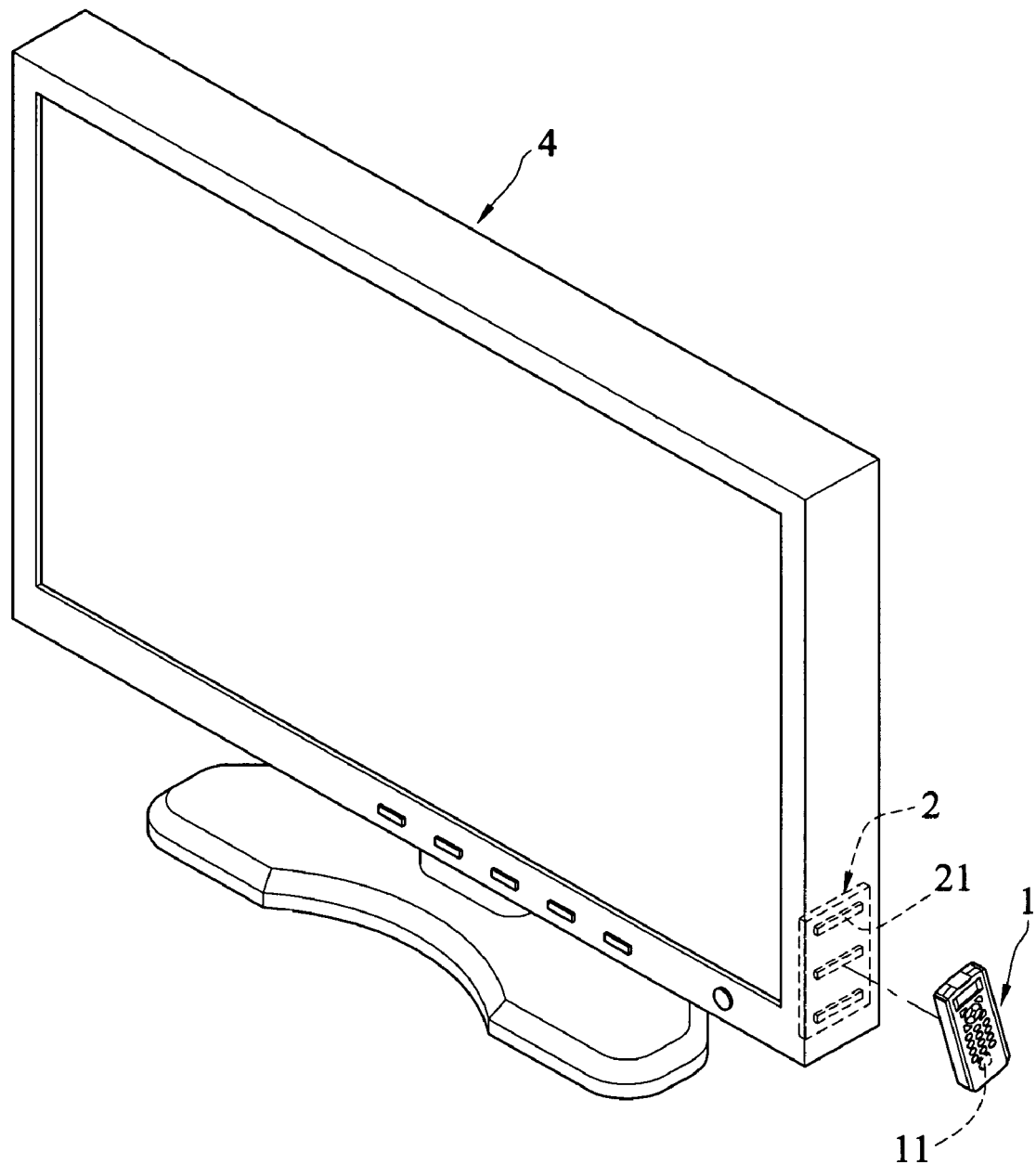
FIG. 5 is a perspective view of the magnetic fixation board of the present invention, built in a casing of an electrical product.

Please refer to FIG. 5, the magnetic fixation board 2 may be disposed on an electrical product 4, and further the magnetic fixation board 2 may be built in a casing of the electrical product 4, so that users can directly attach the portable electronic device 1 to the electrical product 4 after using the portable electronic device 1.

Figure 6:
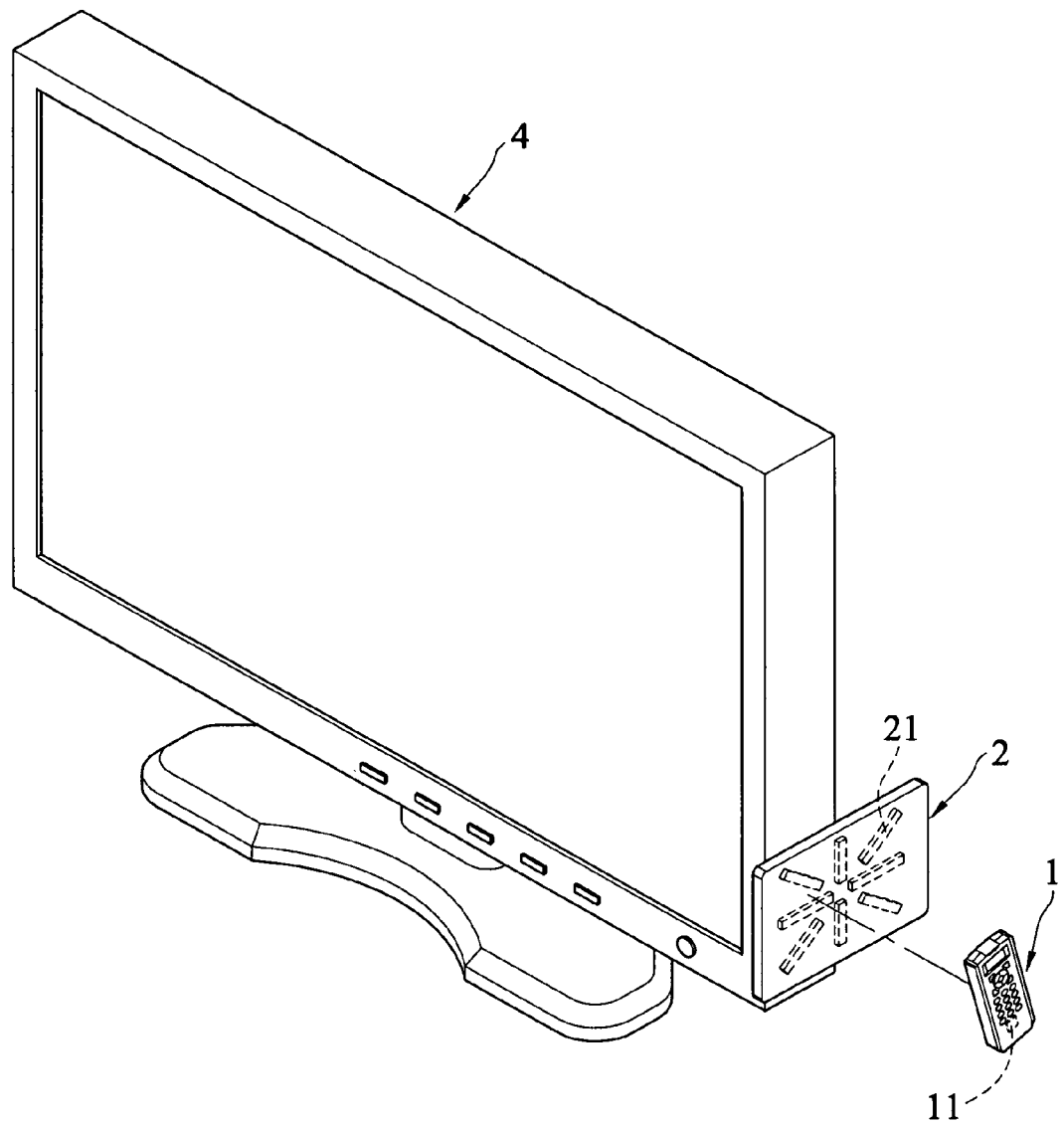
FIG. 6 is a perspective view of the magnetic fixation board of the present invention, disposed on a surface of the casing of the electrical product.

Please refer to FIG. 6, in the same way, the magnetic fixation board 2 may also be attached to a surface of the casing of the electrical product 4 by the adhesive element 22 (not shown), thereby attaching the portable electronic device 1.

Figure 7:
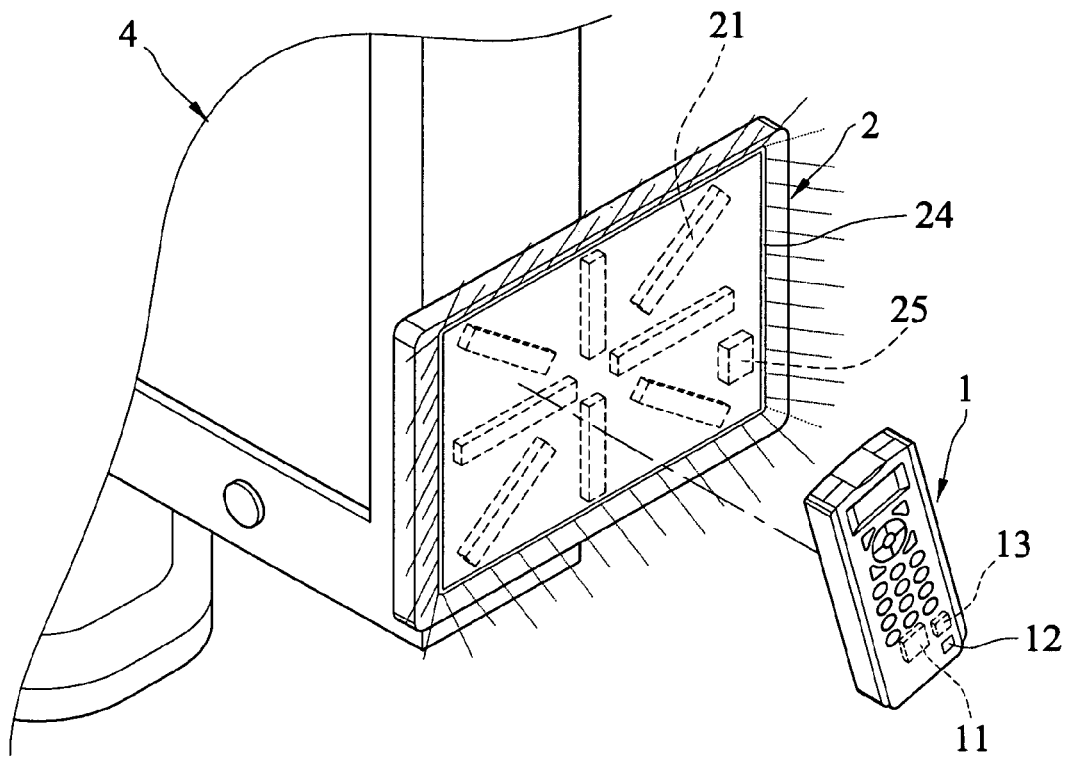
FIG. 7 is a light-emitting schematic view of a second light-emitting element of the present invention.
Figure 8:
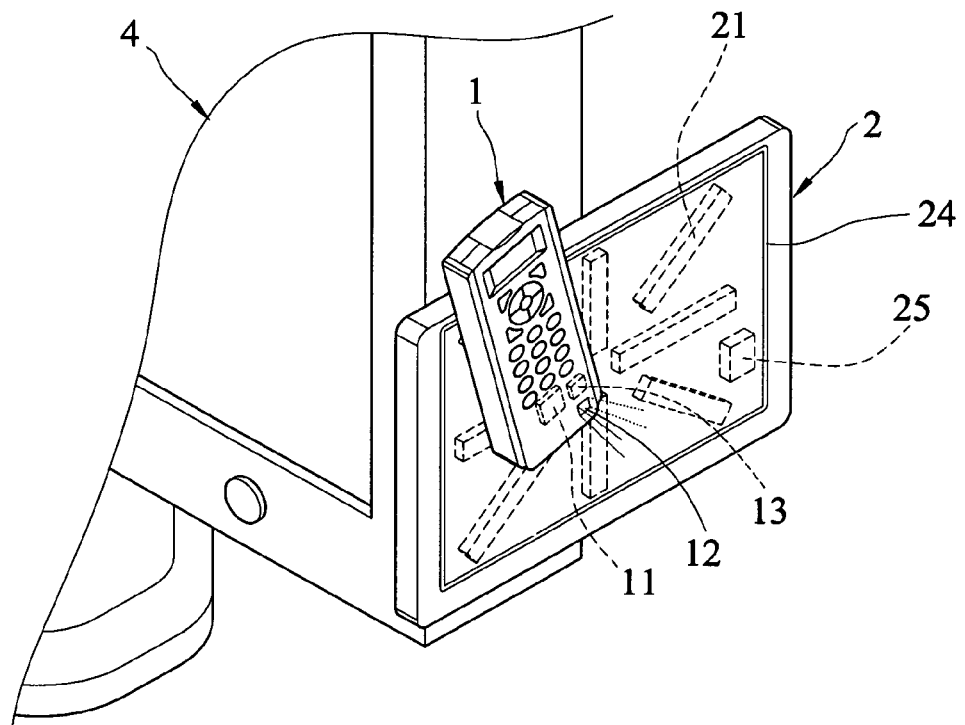
FIG. 8 is a light-emitting schematic view of a first light-emitting element of the present invention.

Please refer to FIG. 7 and FIG. 8, the portable electronic device 1 further may has a first light-emitting element 12 and a first electromagnetic transform unit 13 electrically connected with the first light-emitting element 12. The magnetic fixation board 2 has a second light-emitting element 24 and a second electromagnetic transform unit 25 electrically connected with the second light-emitting element 24.

The first light-emitting element 12 and the second light-emitting element 24 are light-emitting diodes, wherein the second light-emitting element 24 surrounds the second magnetic elements 21 and is disposed on the front surface of the magnetic fixation board 2.

The first light-emitting element 12 of the first portable electronic device 1 is always in a constantly bright state. When the portable electronic device 1 is attached to the magnetic fixation board 2, the first electromagnetic transform unit 13 controls the first light-emitting element 12 of the portable electronic device 1 to go out based on magnetic force change, and at the same time, the second electromagnetic transform unit 25 drives the second light-emitting element 24 to emit light. On the contrary, once the portable electronic device 1 is taken down from the magnetic fixation board 2, the first electromagnetic transform unit 13 drives the first light-emitting element 12 to emit light and the second electromagnetic transform unit 25 controls the second light-emitting element 24 to go out. Accordingly, users can identify the positions of the portable electronic device 1 and the magnetic fixation board 2 in the darkness correctly.

Figure 9:
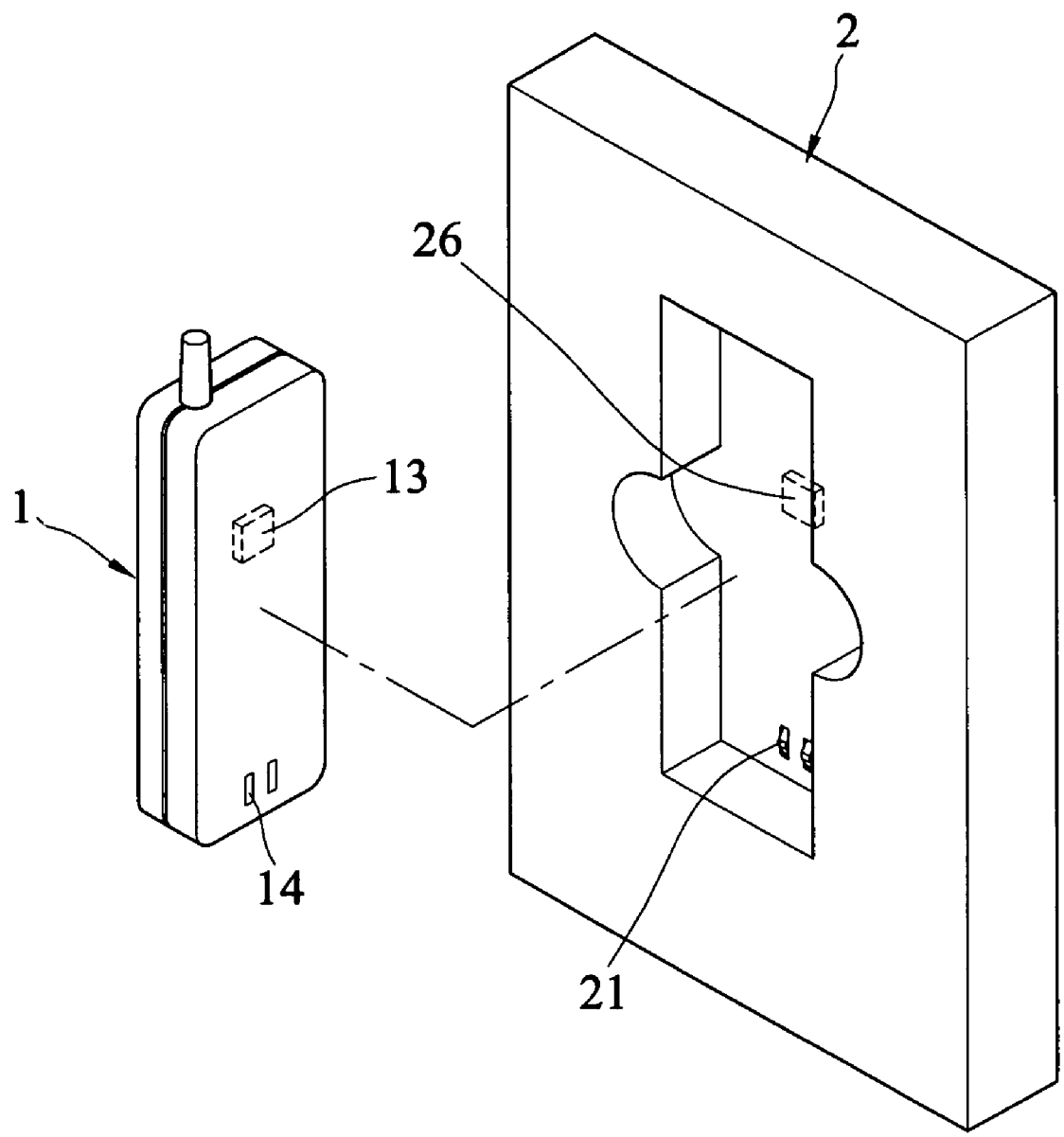
FIG. 9 is a schematic view of the portable electronic device and magnetic fixation board therefor of the present invention which further includes a first terminal group and a second terminal group.

Please refer to FIG. 9, the portable electronic device 1 further includes a first terminal group 14 connected with internal batteries thereof, and the magnetic fixation board 2 includes a second terminal group 26 connected with an external power source. When the first magnetic element 11 of the first portable electronic device 1 is attracted to the second magnetic element 21, the first terminal group 14 contacts with the second terminal group 26 synchronously, thereby charging up the internal batteries in the portable electronic device 1.

It is worthwhile to mention that the portable electronic device 1 may be a remote controller, a wireless telephone and a digital photo frame and so on. Accordingly, those portable electronic devices 1 and magnetic fixation board 2 that can be taken with users and magnetically attracted to be fixed may all be equivalent changes of the present invention:

Consequently, the present invention has the characteristics and functions as follows:

1. Based on the attraction interaction between the first magnetic element 11 of the portable electronic device 1 and the second magnetic element 21 of the magnetic fixation board 2, the present invention can provide an immobile place for users to arrange the portable electronic device 1, thereby avoiding that the portable electronic device 1 is arbitrarily placed and then dropped or struck.

2. When the portable electronic device 1 of the present invention is standing idle, users can directly locate the portable electronic device 1 on the magnetic fixation board 2 in the attraction mode and arrange the portable electronic device 1 conveniently, thereby avoiding leaving houses disorderly and improving the impressions of using electrical products.

What are disclosed above are only the specification and the drawings of the preferred embodiment of the present invention and it is therefore not intended that the present invention be limited to the particular embodiment disclosed. It will be understood by those skilled in the art that various equivalent changes may be made depending on the specification and the drawings of the present invention without departing from the scope of the present invention.

What is claimed is:

1. A portable electronic device and magnetic fixation board therefor, comprising:
   a portable electronic device having a first magnetic unit, a first light-emitting element, and a first electromagnetic transformer unit electrically connected to the first light-emitting element; and
   a magnetic fixation board
   for disposing on a surface, the magnetic fixation board having a second magnetic unit, a second light-emitting element, and a second electromagnetic transformer unit electrically connected with the second light-emitting element, wherein the portable electronic device is detachably coupled to the magnetic fixation board,
   wherein the illumination of the first and the second light-emitting elements is triggered by the attachment and detachment of the portable electronic device to and from the magnetic fixation board.

2. The portable electronic device and magnetic fixation board therefor as claimed in claim 1, wherein the first magnetic unit and the second magnetic unit are magnets.

3. The portable electronic device and magnetic fixation board therefor as claimed in claim 1, wherein the first magnetic unit is a magnet and the second magnetic unit is a metallic element magnetically attractive by the first magnetic unit.

4. The portable electronic device and magnetic fixation board therefor as claimed in claim 1, wherein the second magnetic unit is a magnet and the first magnetic unit is a metallic element magnetically attractive by the second magnetic unit.

5. The portable electronic device and magnetic fixation board therefor as claimed in claim 1, wherein the magnetic fixation board has a plurality of second magnetic units, and the second magnetic units are arranged radially around the centre of the magnetic fixation board.

6. The portable electronic device and magnetic fixation board therefor as claimed in claim 1, wherein the magnetic fixation board has an adhesive element disposed on the rear surface thereof, which adheres to the surface of a wall or the casing of an electrical product.

7. The portable electronic device and magnetic fixation board therefor as claimed in claim 6, wherein the adhesive element is an adhesive strip.

8. The portable electronic device and magnetic fixation board therefor as claimed in claim 5, wherein the magnetic fixation board has a fluorescent coating formed on a front surface of the magnetic fixation board and surrounding the second magnetic units.

9. The portable electronic device and magnetic fixation board therefor as claimed in claim 1, wherein the first light-emitting element and the second light-emitting element are light-emitting diodes, and the second light-emitting element surrounds the second magnetic unit and is disposed on a front surface of the magnetic fixation board.

10. The portable electronic device and magnetic fixation board therefor as claimed in claim 1, wherein the portable electronic device is a remote controller, a wireless telephone or a digital photo frame.

11. The portable electronic device and magnetic fixation board therefor as claimed in claim 1, wherein when the portable electronic device is attached to the magnetic fixation board, the first electromagnetic transform unit causes the first light-emitting element to be switched off and the second electromagnetic transform unit drives the second light-emitting element to emit light.

12. The portable electronic device and magnetic fixation board therefor as claimed in claim 1, wherein when the portable electronic device is taken off from the magnetic fixation board, the first electromagnetic transform unit causes the first light-emitting element to emit light and the second electromagnetic transform unit causes the second light-emitting element to be switched off.

13. A portable electronic device and magnetic fixation board therefor, comprising:
    a portable electronic device having a first magnetic unit, a first terminal unit and a battery connected to the first terminal unit; and
    a magnetic fixation board for disposing on a surface having a second magnetic unit and a second terminal unit,
    wherein the portable electronic device is detachably coupled to the magnetic fixation board,
    wherein the first terminal unit and the second terminal unit are electrically connectable for charging the battery of the portable electronic device.

14. The portable electronic device and magnetic fixation board therefor as claimed in claim 13, wherein the first magnetic unit and the second magnetic unit are magnets.

15. The portable electronic device and magnetic fixation board therefor as claimed in claim 13, wherein the first magnetic unit is a magnet and the second magnetic unit is a metalic element magnetically attractive by the first magnetic unit.

16. The portable electronic device and magnetic fixation board therefor as claimed in claim 13, wherein the second magnetic unit is a magnet and the first magnetic unit is a metalic element magnetically attractive by the second magnetic unit.

17. The portable electronic device and magnetic fixation board therefor as claimed in claim 13, wherein the magnetic fixation board has a plurality of second magnetic units, and the second magnetic units are arranged radially around the centre of the magnetic fixation board.

18. The portable electronic device and magnetic fixation board therefor as claimed in claim 13, wherein the magnetic fixation board has an adhesive element disposed on the rear surface thereof, which adheres to the surface of a wall or the casing of an electrical product.

19. The portable electronic device and magnetic fixation board therefor as claimed in claim 18, wherein the adhesive element is an adhesive strip.

20. The portable electronic device and magnetic fixation board therefor as claimed in claim 17, wherein the magnetic fixation board has a fluorescent coating formed on a front surface of the magnetic fixation board and surrounding the second magnetic units.

21. The portable electronic device and magnetic fixation board therefor as claimed in claim 13, wherein the portable electronic device is a remote controller, a wireless telephone or a digital photo frame.

* * * * *